J. GRAUER.
THREAD CUTTING MACHINE.
APPLICATION FILED NOV. 10, 1919.
1,404,386.
Patented Jan. 24, 1922.
2 SHEETS—SHEET 1.
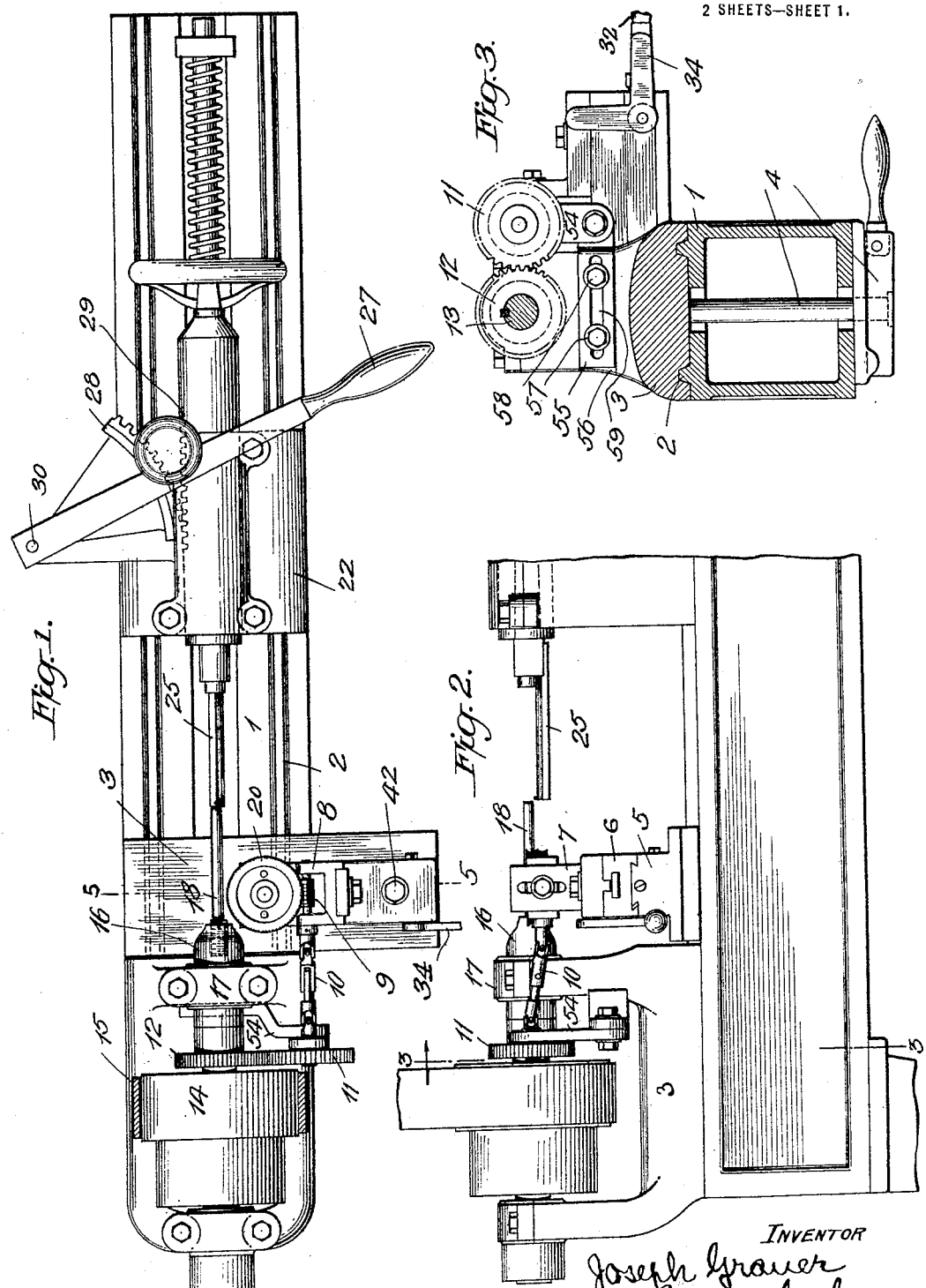
INVENTOR
Joseph Grauer
By his ATTORNEY James L. Barlow

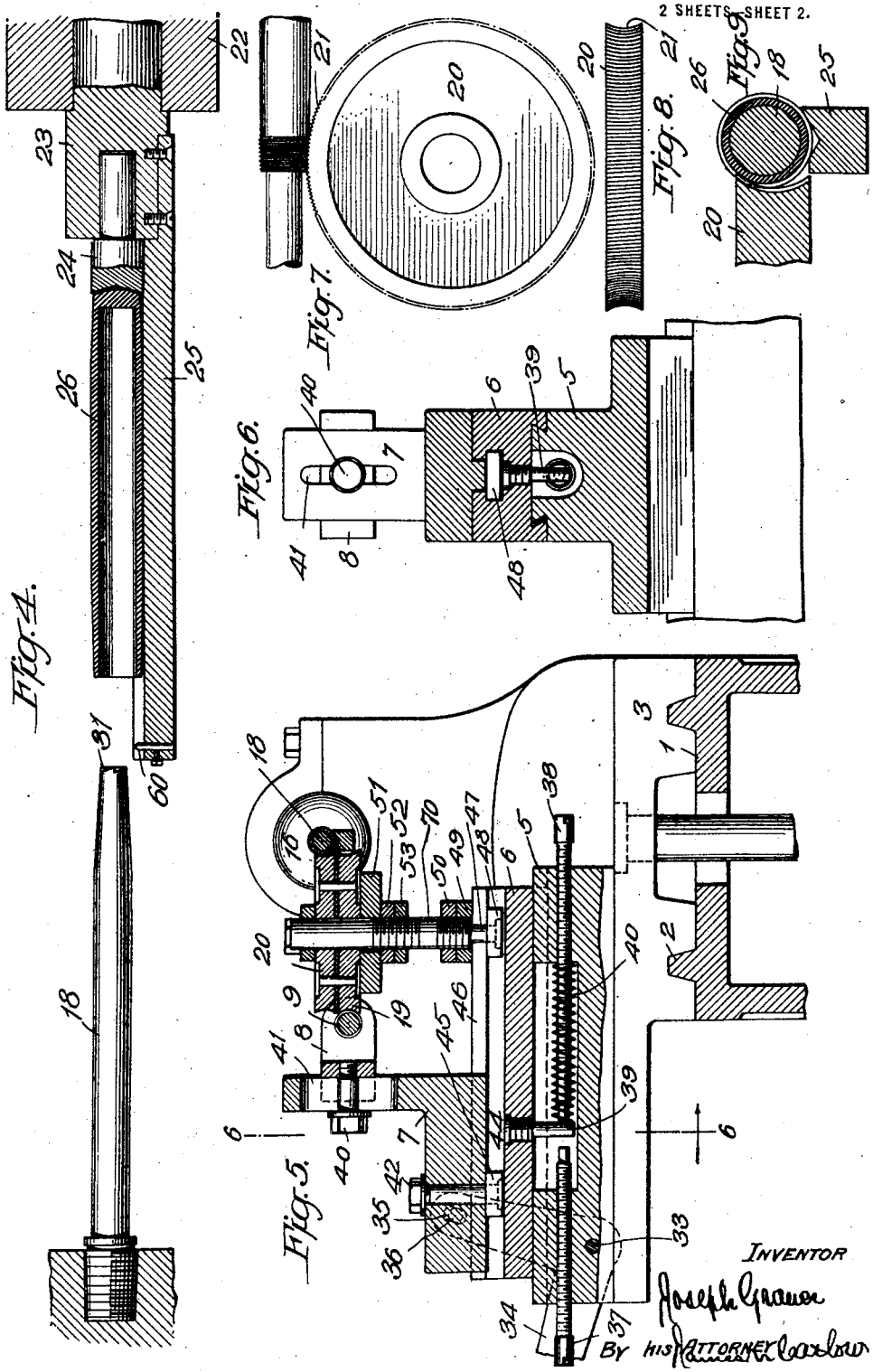

UNITED STATES PATENT OFFICE.

JOSEPH GRAUER, OF BROOKLYN, NEW YORK.

THREAD-CUTTING MACHINE.

1,404,386.  Specification of Letters Patent.  Patented Jan. 24, 1922.

Application filed November 10, 1919. Serial No. 336,965.

*To all whom it may concern:*

Be it known that I, JOSEPH GRAUER, a citizen of the United States, and a resident of the borough of Brooklyn, county of Kings, city and State of New York, have invented a certain new and useful Improvement in Thread-Cutting Machines, of which the following is a specification, reference being had to the accompanying drawings, which form a part of the same.

The object of my invention is to provide a machine for cutting threads on the outer surface of cylindrical bodies, instances being fountain pen barrels, bolts, spindles, screws, and various other articles may be mentioned.

In the drawings,

Fig. 1 is a plan view of a lathe on which my thread cutting machine is mounted;

Fig. 2 is a side elevation of a portion of the same;

Fig. 3 is a cross section taken along the line 3—3 of Fig. 2;

Fig. 4 is a detail view of the work holder;

Fig. 5 is a cross section taken along the line 5—5 of Fig. 1;

Fig. 6 is a cross section taken along the line 6—6 of Fig. 5;

Fig. 7 is an enlargd view of the cutting disc in the operation of threading a cylinder;

Fig. 8 is a peripheral view of the cutting disc; and

Fig. 9 is a detail view showing the method of cutting a thread, by my cutting disc.

Referring now in detail to the drawings, 1 represents the bed of a lathe provided with longitudinal ribs or tracks 2 on which the carriage 3 is adapted to slide longitudinally and to be fastened in adjusted position by the clamp 4.

Mounted on the carriage 3 and adjusted stationary therewith is a platform 5 on which is adapted to slide toward and from the lathe center the support 6 and the mechanism controlled thereby. Adjusted on and held to travel with said support 6 is a bracket 7 on which is mounted a yoke 8, in the legs of which is journalled the driving worm 9 adapted to be functioned through the flexible shaft 10 which is connected therewith at one end, and at the other is connected to and operated by the gear wheel 11 mounted in the supporting link 54 and which link is bolted to the adjustable arm 55. This arm is fitted in a channel 56 in the frame of the machine and is clamped into position by bolts 57 and 58 co-operating with the slot 59 of the arm 55. The gear wheel 11 is in mesh with and operated by the gear wheel 12 which is keyed onto the pulley shaft 13, at one end of which is splined the pulley wheel 14 operated by the belt 15 in any well known manner. Also mounted on the pulley shaft 13 is the cap 16 journalled in the bearings 17 in which cap is integrally supported the spindle 18.

In mesh with the worm 9 is the worm wheel 19 to which is bolted or otherwise secured the cutting disc 20 adapted to travel with said worm wheel. This cutting disc is provided with diagonal cutting teeth 21 therein, the inclination of such teeth controlling the pitch of the thread to be cut in the work to be operated on.

Mounted on the lathe and adapted to slide longitudinally thereto is the block 22 in which is adjustably mounted the arm 23 which in turn carries the revolvable support 24. Carried on the arm 23 is a work rest 25 on which is shown a piece of work in the present instance a fountain pen barrel 26, preparatory to being threaded. The block 22 and its controlled mechanism is manipulated by means of the handle 27 which is attached to the gear segment 28 adapted to mesh with the rack 29 on a block, the said handle and gear segment being swivelled at 30. It will be noted that the work rest 25 is located in a sufficiently lower plane than the spindle 18 to permit the work 26 to ride up onto the spindle 18 in its longitudinal movement to clear the work from the work rest so that in the revolution of the work there will be freedom of the work from the work rest, and friction and scratch which would otherwise obtain will be obviated.

At the end of the spindle 18, I have provided a roughened or stepped portion 31 which effects a positive engagement with the inside end of the work and assists in holding the work firmly with the spindle so as to revolve therewith.

The support 6 mounted on the carriage 3 is adapted to slide to and from the work by manipulation of the handle 32. This handle is swivelled at 33 in the stationary adjusted platform 5, and controls the bell lever 34, the opposite end of which is provided with a slot 35 which is engaged by the stud 36 mounted in the bracket 7, which slides with the support 6 to which said bracket is adapted to be adjusted and fixed. Also adjusted and fixed in said support 6 is the post on which the worm gear 19 and cutting gear 20 are revolvably mounted. It will be seen from this construction that the worm 9 is constantly in mesh with the worm gear 19 and that the same and their parts form a unitary assembly.

In order to limit the sliding motion of the cutting assembly, I have provided in the stationary platform 5, adjusting screws 37 and 38 which are disposed toward and in alignment with each other, and are also in alignment with the stud 39 integrally mounted in the sliding support 6. On the shank of the screw 38, I have provided a spring 40 designed to hold the cutting assembly away from the work when not positively held against it.

The vertical position of the worm 9 is adjusted by means of the set screw 40 and slot 41 arranged in the bracket 7. This set screw engages the web of the yoke 8 and after its proper vertical position has been determined, the set screw 40 is turned down until the yoke 8 is securely held in position against the bracket 7. The support 6 is provided with a channel 44 and slot 46 communicating therewith. The bracket 7 and the parts supported thereby are capable of lateral adjustment by means of the bolt 42 and block 45 in co-operation with said slot and channel. The shank of the bolt 42 passes through the base of the bracket 7, and the slot 46, into the block 45 in the channel 44, the said block being of greater width than said slot. The post 70 is adapted to be laterally adjusted and for this purpose the reduced end 47 thereof is passed through the slot 46 into the block 48 which block is wider than the said slot. This post 70 is fastened in adjusted position by the nut 49 and the lock nut 50 in the usual manner. The worm gear 19 and its attached cutter disc 20 are adapted to vertical adjustment on the post 70 by means of the platform 51, the nut 52 and the lock nut 53, the said nuts being manipulated to obtain the proper adjustment of said worm gear and cutter disc.

In operation, the machine is connected with any suitable source of power through the belt 15 which turns the pulley 14 on the shaft to which is splined the gear wheel 12 and the cap 16, in which is integrally mounted the spindle 18. The gear wheel 11 in mesh with the gear wheel 12 is driven by the latter gear wheel and revolves the flexible shaft 10 which in turn controls the worm 9 which operates the cutter disc 20. It will, therefore, be seen that both the spindle 18 and the cutter disc 20 are given positive synchronous movement, the chronology thereof being determined by the relationship of the gear wheels 11 and 12 to each other. The machine being in operation, the piece of work in the present showing a fountain pen barrel 26 is placed in the work rest 25 and by manipulation of the handle 27 the segment 28 engages the rack 29 on block 22 moving the same forward toward the spindle 18. The center of the work being lower than the center of the spindle, the work rides up on the spindle in its horizontal movement until the work is entirely supported by the spindle and being clear of the work rest, thus eliminating the possibility of scratch or friction by contact therewith, while on the revolving spindle. The stepped or roughened end of the spindle engages the inner end of the barrel and assists in giving the barrel a positive movement with the spindle. The bell crank 34 is then given an upward movement which effects a carrying forward of the bracket 7, the carriage 6, and the parts supported by said bracket and carriage, including the cutter disc 20. This forward movement brings the cutter disc in contact with the barrel to be threaded. The cutter disc is shown disposed with reference to the barrel to be threaded so that only the upper part of the teeth on the cutter disc will engage the barrel. This is clearly shown in Fig. 9. The movement of the barrel is against the teeth of the cutter disc which make their cut in a shearing or chasing manner. The movement of the cutter disc is in an anti-clockwise direction looking at the same from the top. When the thread has been cut into the work, the bell crank 34 is pressed down withdrawing the cutter disc 20 from the work and the handle 27 is moved backward withdrawing the barrel from the spindle by means of the projection 60 extending from the bed of the work rest 25, said projection engaging the open end of the barrel and carrying the same off the spindle in the backward movement of the work rest. The work is then removed and another piece put on the work rest and the machine is then ready to be passed through the same cycle and manipulation.

It is, of course, understood that many modifications may be made in the construction of such a machine, and that a single thread or a multiplicity of threads may be cut on a piece of work by my device, without departing from the spirit of my invention. I do not wish to be limited, therefore, to the disclosures shown, but what I desire to protect by Letters Patent is set forth in the appended claims:

1. A thread cutter comprising a disc provided with diagonal cutting teeth on its periphery, said teeth being parallel to each other and being adapted to cut a thread or threads at an angle to the plane of the said disc, a worm wheel unitary with said disc, a post upon which said cutter disc and worm wheel are mounted and adapted to revolve, a sliding support in which said post is stationed, a bracket also stationed in said sliding support, a worm mounted on said bracket and in mesh with said worm gear, a flexible shaft and a driving power gear, said flexible shaft being connected to and revolved by said driving power gear at one end and at the other end being connected to the said worm, and means for sliding said sliding support and its connected mechanism to cut a thread or threads.

2. A thread cutter comprising a disc provided with diagonal cutting teeth on its periphery, said teeth being parallel to each other and being adapted to cut a thread or threads at an angle to the plane of the said disc, a worm wheel unitary with said disc, a post upon which said cutter disc and worm wheel are mounted and adapted to revolve, a sliding support in which said post is stationed, a bracket also stationed in said sliding support, a worm mounted on said bracket and in mesh with said worm gear, a flexible shaft and a driving power gear, said flexible shaft being connected to and revolved by said driving power gear at one end and at the other end being connected to the said worm, and means for sliding said sliding support and its connected mechanism to cut a thread or threads, a driving power gear in mesh with said driven power gear, a pulley and pulley shaft, said driving power gear being splined on said pulley shaft, a work holder and means for connecting said work holder to said pulley shaft.

3. A thread cutter comprising a disc provided with diagonal cutting teeth on its periphery, said teeth being parallel to each other and being adapted to cut a thread or threads at an angle to the plane of the said disc, a worm wheel unitary with said disc, a post upon which said cutter disc and worm wheel are mounted and adapted to revolve, a sliding support in which said post is stationed, a bracket also stationed in said sliding support, a worm mounted on said bracket and in mesh with said worm gear, a flexible shaft and a driving power gear, said flexible shaft being connected to and revolved by said driving power gear at one end and at the other end being connected to the said worm, and means for sliding said sliding support and its connected mechanism to cut a thread or threads, a driving power gear in mesh with said driven power gear, a pulley and pulley shaft, said driving power gear being splined on said pulley shaft, a work holder and means for connecting said work holder to said pulley shaft, a work rest, a sliding support for said work rest and means for sliding the same in substantially parallel plane with said work holder and beneath the same.

4. A thread cutter comprising a disc provided with diagonal cutting teeth, on its periphery, said teeth being parallel with each other and being adapted to cut a thread or threads at an angle to the plane of the said disc, a worm wheel unitary with said disc, a post upon which said cutter disc and worm wheel are mounted and adapted to revolve, means for adjusting said cutter disc and worm wheel vertically on said post, a sliding support in which said post is stationed, a bracket also stationed in said sliding support a worm mounted on said bracket and in mesh with said worm gear, a flexible shaft and driving power gear, said flexible shaft being connected to and revolved by said driving power gear at one end and at the other end being connected to the said worm and means for sliding said sliding support and its connected mechanism to cut a thread or threads.

5. A thread cutter comprising a disc provided with diagonal cutting teeth on its periphery, said teeth being parallel to each other and being adapted to cut a thread or threads at an angle to the plane of the said disc, a worm wheel unitary with said disc, a post upon which said cutter disc and worm wheel are mounted and adapted to revolve, a sliding support in which said post is stationed, means for laterally adjusting said post in said support, a bracket also stationed in said sliding support, a worm mounted on said bracket and in mesh with said worm gear, a flexible shaft and driving power gear, said flexible shaft being connected to and revolved by said driving power gear at one end and at the other end being connected to the said worm, and means for sliding said sliding support and its connected mechanism to cut a thread or threads.

6. A thread cutter comprising a disc provided with diagonal cutting teeth on its periphery, said teeth being parallel to each other and being adapted to cut a thread or threads at an angle to the plane of the said disc, a worm wheel unitary with said disc, a post upon which said cutter disc and worm wheel are mounted and adapted to revolve, a sliding support in which said post is stationed, a bracket also stationed in said sliding support, means for laterally adjusting said bracket in said support, a worm mounted on said bracket and in mesh with said worm gear, a flexible shaft and a driving power gear, said flexible shaft being connected to and revolved by said driving power gear at one end and at the other end being connected to the said worm and means for sliding said sliding support and its connected mechanism to cut a thread or threads.

7. A thread cutter comprising a disc provided with diagonal cutting teeth on its periphery, said teeth being parallel to each other and being adapted to cut a thread or threads at an angle to the plane of the said disc, a worm wheel unitary with said disc, a post upon which said cutter disc and worm wheel are mounted and adapted to revolve, a sliding support in which said post is stationed, a bracket also stationed in said sliding support, a worm mounted on said bracket and in mesh with said worm gear, means for adjusting said worm in a lateral and vertical direction, a flexible shaft and driving power gear, said flexible shaft being connected to and revolved by said driving power gear at one end and at the other end being connected to the said worm and means for sliding said sliding support and its connected mechanism to cut a thread or threads.

8. A thread cutter comprising a disc provided with diagonal cutting teeth on its periphery, said teeth being parallel to each other and being adapted to cut a thread or threads at an angle to the plane of the said disc, a worm wheel unitary with said disc, a post upon which said cutter disc and worm wheel are mounted and adapted to revolve, a sliding support in which said post is stationed, means for limiting the movement of said sliding support, a bracket also stationed in said sliding support, a worm mounted on said bracket and in mesh with said worm gear, a flexible shaft and driving power gear, said flexible shaft being connected to and revolved by said driving power gear at one end and at the other end being connected to the said worm and means for sliding said sliding support and its connected mechanism to cut a thread or threads.

9. A thread cutter comprising a disc provided with diagonal cutting teeth on its periphery, said teeth being parallel to each other and being adapted to cut a thread or threads at an angle to the plane of the said disc, a worm wheel unitary with said disc, a post upon which said cutter disc and worm wheel are mounted and adapted to revolve, a sliding support in which said post is stationed, a bracket also stationed in said sliding support, a worm mounted on said bracket and in mesh with said worm gear, a flexible shaft and a driving power gear, said flexible shaft being connected to and revolved by said driving power gear at one end and at the other end being connected to the said worm, and means for sliding said sliding support and its connected mechanism to cut a thread or threads, a driving power gear in mesh with said driven power gear, a pulley and pulley shaft, said driving power gear being splined on said pulley shaft, a work holder and means for connecting said work holder to said pulley shaft, a work rest, a sliding support for said work rest and means for sliding the same in substantially parallel plane with said work holder and beneath the same, a projection protruding from said work rest and adapted to engage work on said spindle and remove the same thereform.

JOSEPH GRAUER.